Sept. 12, 1933.   J. A. MILLER ET AL   1,926,879
FILM MARKING DEVICE
Filed Jan. 13, 1931    2 Sheets-Sheet 2
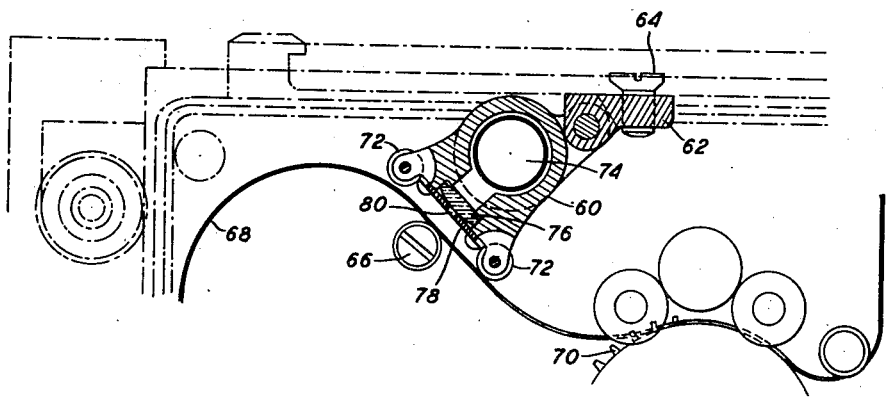
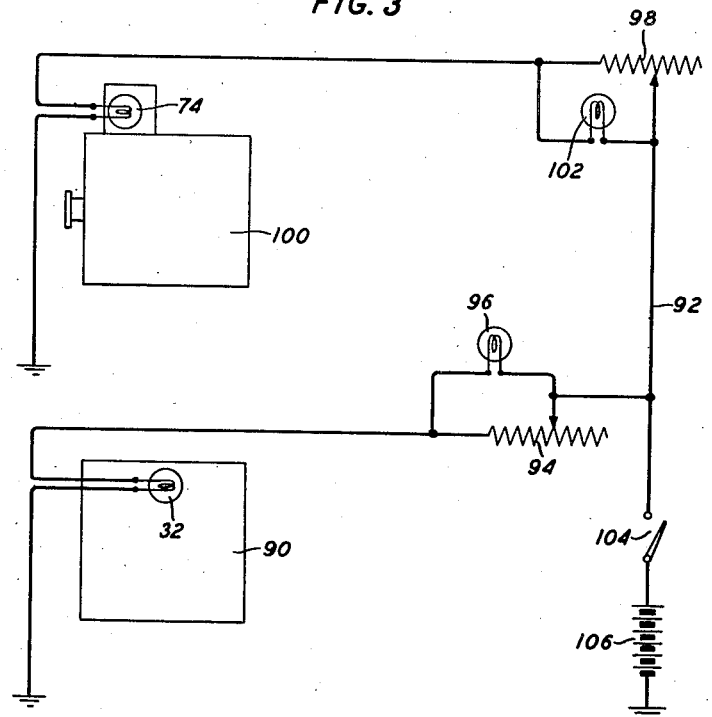
INVENTORS: J. A. MILLER
S. S. A. WATKINS
G. A. G. SIMPSON
BY
G. H. Heydt
ATTORNEY Patented Sept. 12, 1933

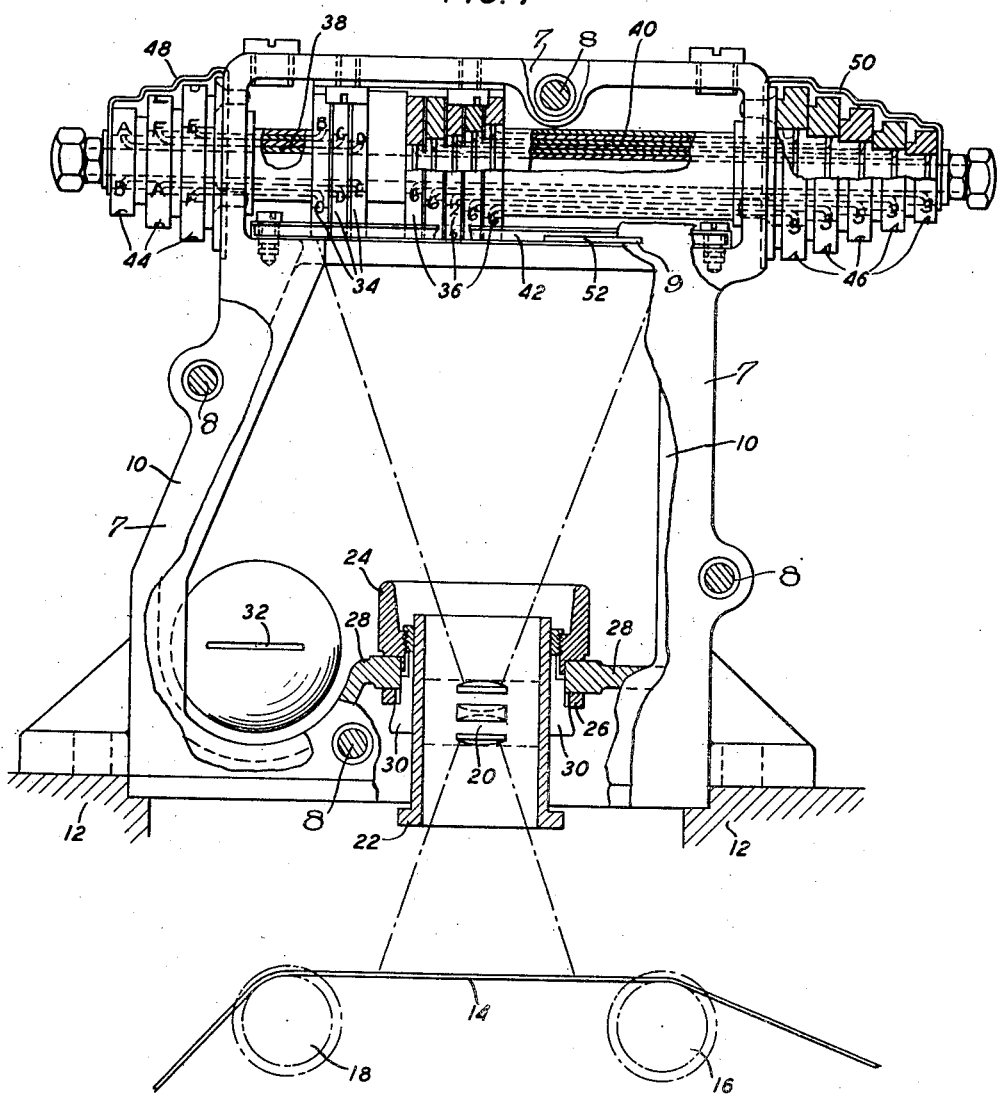

1,926,879

UNITED STATES PATENT OFFICE

1,926,879

FILM MARKING DEVICE

James A. Miller, London, Stanley S. A. Watkins, Kew Gardens, and Geoffrey A. G. Simpson, London, England, assignors to Electrical Research Products Inc., New York, N. Y., a corporation of Delaware Application January 13, 1931, Serial No. 508,486, and in Great Britain January 10, 1930

5 Claims. (Cl. 95—1.1)

This invention relates to sound picture systems and more particularly to the production of reference characters upon photographic film employed in picture and sound recording cameras.

In the manufacture of such film records, it is frequently desirable to effect upon the records, certain registration or indicating marks by means of which particular points of the film record may subsequently be identified. Particularly in the case of film records of sound is it necessary to provide such registration marks, because the sound record in general presents no characteristics by which any particular portion can be identified by examination. It has heretofore been proposed to produce such registration or indicating marks upon photographic film records by punching holes through the film during the exposure of the film to light to effect the record or immediately after any particular exposure or series of exposures has been made while the film is in position in the recording device or camera, hereinafter referred to generically as a camera. This operation, however, suffers from the objection that the punchings of film remain in the camera and may cause interference with the mechanism of the camera, and in any case they have to be frequently removed from the camera. It is also the practice, in cinematograph photography to effect such a registration or indicating mark, by taking, at the end of a scene or like, upon the film, by means of the ordinary talking lens and shutter, one or more photographs of a board bearing a legend.

According to the present invention, a photographic registration or indicating mark is effected upon the film either before, during or immediately after, the exposure of the film while the latter remains in the camera by means of a subsidiary exposing device, other than that by which the record is effected, located within or upon the camera. In other words, a subsidiary camera is associated with the main camera and can be utilized to make records upon the film. The registration marks effected by this subsidiary camera may be located in the margin of the film record, or at any other desired point thereon. When simultaneous sound and picture records are being made upon separate films, registration marks may be effected in corresponding positions on both the picture film and upon the sound film. Thus by proper relative positioning of the registration marks of the two negative records with respect to a positive record film in the printing operation, the sound and picture records may be effected upon the positive film with a correct displacement to suit any particular reproducing and projecting machine.

In its application to the sound recording camera the invention comprises a light-tight chamber having a lens mounted in one wall thereof, a plurality of adjustable legend bearing surfaces within the chamber and opposite to the lens, and a lamp located adjacent but screened from the lens and adapted to illuminate the legend bearing surfaces. An image of the legend bearing surfaces is thus projected upon the sound film by light reflected from the surfaces and focussed by the lens. The legend bearing surfaces may consist of a plurality of cylindrical collars severally mounted upon nested hollow spindles which project through the wall or walls of the light-tight chamber so that they can be manually rotated from the outside of the chamber.

In its application to the picture camera the invention comprises a light-tight chamber containing a light source located adjacent to and registered with respect to a guide roller or the like over which the film passes in the camera. A lens is mounted in one wall of the chamber to concentrate the light from the source upon the picture film. Preferably also a mask with a slit therein is disposed adjacent the lens to produce a narrow line image upon the film transverse to the length thereof.

The lamps in the sound recording camera and the picture camera respectively may be connected together with a common electric circuit and switch so that both lamps may be simultaneously energized. Preferably also signal lamps are associated with this electrical circuit so that they are simultaneously energized. These signal lamps may be so mounted as to be visible to the supervisor or other party responsible for the production and recording of the scene.

One embodiment of the invention is illustrated, by way of example only, in the drawings which accompany this specification in which Fig. 1 is a vertical section through part of a sound recording apparatus and through the light-tight chamber. Fig. 2 is a vertical section through part of the picture camera illustrating the application thereto of a light-tight chamber according to the invention. Fig. 3 is an electrical circuit diagram illustrating one form of electric circuit by means of which the lamps in the picture camera and in the sound recording camera may be simultaneously operated.

Referring now to Fig. 1, a light-tight casing 10 preferably of cast aluminium or the like, is mounted in an orifice in the top 12 of the sound recording camera. The film 14 upon which the sound is to be recorded runs over two flanged rollers 16 and 18, immediately below the light-tight chamber 10. A lens 20, illustrated diagrammatically, is mounted in a lens tube 22 which latter is held by clamping rings 24 and 26 in a web 28 which effectively forms the bottom of the light-tight casing. The lens 20 is adjustably clamped by the rings 24 and 26 and split conical sleeve 30 so that it may be moved axially for the purpose of focussing. There is provided a removable cover plate 7 secured to the casing 10 by means of bolts 8. The plate 7 is broken away as indicated by the irregular line in order to show the interior of casing 10.

An electric lamp 32 is mounted in the lower part of the light-tight chamber 10 in such a manner that no light from the filament thereof can fall directly upon the lens 20. Moreover the walls of the chamber 10 are so shaped that no light is reflected from them directly into the lens 20.

At the top of the light-tight chamber a plurality of cylindrical collars 34 and 36 are mounted upon nested tubular spindles 38 and 40. A segment of each of the collars 34 and 36 projects through a hole or slot in a masking plate 42 which forms the top closure of the light-tight chamber 10. The groups of nested spindles 38 and 40 are respectively provided with groups of adjusting handles 44 and 46. By rotation of any one of the handles 44 or 46 the corresponding collar is rotated. A plurality of legends, such as numerals or letters, are printed or engraved upon each collar and corresponding legends are inscribed upon each handle. Indexes 48 and 50 are provided to cooperate with the legends upon the handles. In addition, a slide 52 is provided which may be slid in through a slot 9 in the wall 7 of the light-tight chamber and may be of white material adapted to receive a legend written in pencil or ink thereon. The slide 52 occupies a slot formed in the mask 42. In the operation of the device, the handles 46 and 44 are manipulated to set the collars 34 and 36 in such a manner that the appropriate numerals or letters engraved on these collars protrude through the slots in the mask 42 and face the lens 20. Any required legend may also be written upon the slide 52. When the lamp 32 is energized, the legends so set up are illuminated and an image of these legends is projected upon the film 14 which is thereby exposed. On subsequent development of a film an identifying legend appears thereon.

Referring to Fig. 2 a light-tight chamber in the form of an approximately cylindrical casting 60 is mounted by means of a bracket 62 and set screw 64 to the top of the picture camera near a guide roller 66 over which the film 68 passes in its passage from the feed sprocket 70 to the gate. The casting 60 is preferably provided with two rollers 72 for the purpose of preventing injury to the film. A tubular electric lamp 74 is mounted within the casting 60. In the side of a casting which is nearest the roller 66 is an orifice containing a lens 76 masked by a disc 78 having a fine slit 80 therein.

In the operation of the device shown in Fig. 2 upon the energization of the lamp 74, the light thereof is concentrated by the lens 76 and projected through the slit 80 to produce a narrow line image upon the film 68 transverse to the length of the film.

Referring now to Fig. 3 the lamp 32 in the sound recording camera 90 is connected between earth and a common connection 92, an adjustable resistance 94 shunted by a signal lamp 96 being included in series with the lamp 32. Similarly the lamp 74 of the picture camera 100 is connected between earth and the common conductor 92, an adjustable resistance 98 shunted by a signal lamp 102 being included in series with the lamp 74. The lamps 32, 74, 96 and 102 are preferably all lamps intended for use with a voltage of 6 volts. The common conductor 92 is connected through a switch 104 and a battery 106 to earth. The battery 106 is preferably such that it delivers a pressure of 12 volts. The switch 104 is preferably of the known impulse type, which after being manually closed remains closed for a predetermined interval and thereafter opens automatically. The switch 104 is preferably under the control of the supervisor. By adjustment of the time during which the switch 104 remains closed and by adjustment of the resistances 104 and 102 it may be arranged that the lamps 32 and 74 produce properly exposed images upon the films 14 and 68 respectively every time the switch 104 is closed.

In the operation of the system when the scene is ready and the sound camera 90 and picture camera 100 are brought into position and are interlocked with one another, the switch 104 is closed thus effecting a legend upon the sound film 14 and effecting a synchronizing mark in a precisely determined position upon the picture film 68. Also a picture of a board containing a legend corresponding to that set up on the collars 34 and 36 may be taken by the picture camera upon the film 68. Thereafter the two cameras 90 and 100 are operated in synchronism with one another. On subsequent development of the films corresponding images and registration marks appear thereon so that there is no difficulty in assembling a picture film and the corresponding sound film in proper position in the printing operation.

It will be appreciated that the above description is given by way of example only and that many modifications may be made without departing from the scope of the invention.

What is claimed is:

1. The combination with a photographic camera, of a subsidiary exposing device for producing reference characters on said camera film, said device comprising a light-tight chamber having a lens in one wall thereof, a plurality of adjustable legend bearing surfaces within said chamber, a light source, and means located without said chamber for separately adjusting each of said legend bearing surfaces.

2. A subsidiary exposing device for a photographic camera comprising a light-tight chamber, a plurality of legend bearing surfaces therein, a light source for illuminating said surfaces, said legend bearing surfaces comprising a plurality of cylindrical collars severally mounted on nested hollow spindles which project through the wall of said chamber, and means external to said chamber and attached to said spindles for adjusting said legend bearing surfaces.

3. A subsidiary exposing device for a photographic camera comprising a light-tight chamber, a plurality of legend bearing surfaces mounted therein, said legend bearing surfaces comprising a plurality of cylindrical collars severally mounted on nested hollow spindles which project through the walls of said chamber, means external to said chamber and attached to said spindles for adjusting said legend bearing surfaces, a light source for illuminating said surfaces, and a lens mounted in one wall of said chamber for producing an image of said legend bearing surfaces.

4. A subsidiary exposing device for a photographic camera comprising a light-tight chamber, a plurality of legend bearing surfaces therein, a light source for illuminating said surfaces, a plurality of means external to said chamber bearing visible legends corresponding to the legends on said surfaces, and means connecting said external means and said legend bearing surfaces whereby the latter may be adjusted external to said chamber.

5. A subsidiary exposing device for a photographic camera comprising a light-tight chamber, a plurality of legend bearing surfaces, a light source for illuminating said surfaces, and means whereby said legend bearing surfaces may be adjusted external to said chamber, said means comprising a plurality of cylindrical collars external to said chamber and bearing legends corresponding to the legends on said legend bearing surfaces, and means connecting said collars to said legend surfaces.

JAMES A. MILLER.
STANLEY S. A. WATKINS.
GEOFFREY A. G. SIMPSON.